United States Patent [19]

Knothe et al.

[11] 4,300,647
[45] Nov. 17, 1981

[54] ELECTROMAGNETIC FORCE COMPENSATION SCALE WITH TEMPERATURE COMPENSATION

[75] Inventors: Erich Knothe, Bovenden; Franz-Josef Melcher; Jürgen Ober, both of Hardegsen; Lothar Behrend, Gleichen/Diemarden, all of Fed. Rep. of Germany

[73] Assignee: Sartorius GmbH, Fed. Rep. of Germany

[21] Appl. No.: 171,292

[22] Filed: Jul. 23, 1980

[30] Foreign Application Priority Data

Jan. 24, 1980 [DE] Fed. Rep. of Germany ....... 3002462

[51] Int. Cl.³ .......................... G01G 7/00; G01G 3/14
[52] U.S. Cl. ............................ 177/212; 177/210 EM
[58] Field of Search .................... 177/210 EM, 212

[56] References Cited

U.S. PATENT DOCUMENTS

| 3,688,854 | 9/1972 | Strobel | 177/212 X |
| 4,034,819 | 7/1977 | Akers et al. | 177/212 X |
| 4,062,417 | 12/1977 | Kunz | 177/212 |
| 4,159,747 | 7/1979 | Realini | 177/212 X |
| 4,245,711 | 1/1981 | Kunz | 177/212 |

Primary Examiner—George H. Miller, Jr.
Attorney, Agent, or Firm—Eric P. Schellin

[57] ABSTRACT

A scale of the electromagnetic force compensation principle, having a stationary permanent magnet system with an air gap and at least one coil positioned in the air gap, the coil being acted upon via a position sensor and a variable-gain amplifier by a compensation direct current dependent on the load of the scale, wherein the compensation direct current flows through a measuring resistor from both ends of which a signal dependent on the load of the scale is tapped off and fed to an analog/digital converter, and further electric circuits are connected therewith which permit an alternating current to flow, in addition to the compensation direct current, through the coil and the measuring resistor and including a regulating or adjusting device which modifies the amplitude of the additional alternating current in such a manner that the joulean heat generated in the coil and in the measuring resistor by the compensation direct current and by the additional alternating current is at least approximately load-independent.

13 Claims, 5 Drawing Figures

ELECTROMAGNETIC FORCE COMPENSATION SCALE WITH TEMPERATURE COMPENSATION

BACKGROUND OF THE INVENTION

1. Field of the Invention

The invention relates to a scale which operates according to the principle of electromagnetic force compensation, with at least one coil positioned in the air gap of a stationary permanent magnet system and acted upon, via a position sensor and a control amplifier, by a compensation direct current dependent on the load of the scale, and a precision resistor for measuring purposes through which the same compensation direct current flows and at both ends of which a signal dependent on the load of the scale can be tapped off and be fed to an analog/digital converter.

2. Prior Art

Because of joulean heat in such scales, the load-dependent compensation direct current causes a load-dependent temperature increase of the coil and the measuring resistor. These temperature variations at varying load of the scale are transmitted from the coil and the measuring resistor to the other parts of the scale. The parallel construction for the load scale is especially sensitive to temperature variations. When, e.g., the parallel construction is constructed according to U.S. Pat. No. 4,062,416, the guide that is closer to the coil is heated more quickly and strongly than the other guide. This results in mechanical stresses within the parallel construction and therefore in zero point variations of the scale. The load-dependent temperature increase in the measuring resistor results in small but noticeable sensitivity variations, particularly in scales with high resolution. In the use of the scale, intermissions and periods of small loads and periods with large loads follow each other statistically, so that various average temperatures as well as various chronological and local temperature gradients appear. The zero point and sensitivity variations caused thereby limit the meaningful resolution of the scale.

Some scales are provided with an additional correction coil in the permanent magnet system which is to offset the feedback of the coil to the permanent magnet system, as is described, e.g., in U.S. Pat. No. 2,780,101, and explained as to its mode of functioning. This additional correction coil is also traversed by the load-dependent compensation direct current and presents a further load-dependent heat source which likewise contributes to the temperature variations described.

In order to diminish the disadvantages described, it has already been proposed (U.S. Pat. No. 4,134,468) to provide near the coil additional heat-generating means which is electrically connected in such a manner that the sum of the heating powers at no load and full load value is substantially the same. This procedure, however, on the one hand, does not take into account at all the variable dissipation loss in the measuring resistor, so that the error effect thereof remains fully preserved. On the other hand, with respect to the coil, there is also only a partial efficiency.

Either the additional heat-generating means is arranged outside the air gap of the permanent magnet system at a short distance from the coil, so that at varying loads a variation in the location of the heat-generation results, or the further heat-generating means is positioned as a thin layer within the air gap of the permanent magnet system. In the first arrangement, varying temperature gradients result, and in the second arrangement, the same heat generation in the coil and in further heat-generating means causes different temperature increases, and the heating and cooling time constants are also different. In this case too, therefore, temperature conditions vary with the load. In a third alternative, the further heat-generating means may be arranged in the same size as the coil (and thus with the same specific heat generation) within the air gap of the permanent magnet system. In this case, however, only one half of the air gap volume can be utilized for electromagnetic force compensation, so that for a prespecified permanent magnet system and at a prespecified bearing capacity the heat generation in the coil is twice as great and therefore the thermal errors become even more conspicuous.

Moreover, it has already been proposed (German Pat. No. 27 22,093) to pass through the coil and measuring resistor, alternately, a current in positive and negative direction, in which case the relative switching-on duration of the two directions is controlled in a load-dependent manner. By this procedure, to be sure, a load-independent heat generation in the coil and in the measuring resistor is achieved, but the circuits are expensive since two voltage sources of different polarities are necessary and since the inductivity of the coil produces at the switching of the current direction high voltage peaks.

SUMMARY OF THE INVENTION

An object of the invention is, therefore, to provide an indicating scale wherein with simple means a load independence of the heat generation in the coil and in the measuring resistor is achieved.

Furthermore, in scales with an additional correction coil, the invention aims at achieving the load independence of the heat generation also in this correction coil.

In order to carry out these and other objects, the invention relates to a scale according to the principle of electromagnetic force compensation with at least one coil positioned in the air gap of a stationary permanent magnet system and acted upon, via a position sensor and a control amplifier, by a compensation direct current dependent on the load of the scale, and a precision resistor for measuring purposes through which the same compensation direct current flows and at both ends of which a signal dependent on the load of the scale can be tapped off and be fed to an analog/digital converter. In such a scale, additional switching means are now provided which permit the flowing, in addition to the compensation direct current, of an alternating current, through the coil and the measuring resistor and furthermore a regulating device is provided which varies the amplitude of the additional alternating current in such a way that the joulean heat generated in the coil and in the measuring resistor by the compensation direct current and the additional alternating current is at least approximately load-independent.

In a first advantageous development, the regulating device comprises a filament resistor and a thermal detector in close thermal contact, e.g., in the form of a commercially available externally heated NTC resistor. In this structure, the heating resistor is series-connected to the coil and the measuring resistor and traversed by the compensation direct current as well as by the additional alternating current. The thermal detector supplies the input signal of a regulating circuit which changes the amplitude of the additional alternating current in such a way that the joulean heat converted in the heating resistor and therewith the temperature of the thermal detector and thus also the output signal thereof remain as constant as possible. Consequently, the joulean heat converted in the coil and in the measuring resistor remains automatically also constant.

In a further advantageous development, the regulating device comprises an incandescent filament and a radiation sensor, e.g., a photocell or a phototransistor. In this structure, the incandescent filament is series-connected to the coil and the measuring resistor, and traversed by the compensation direct current as well as by the additional alternating current. The joulean heat converted in the incandescent filament determines the temperature thereof and is optically measured by the radiation sensor. The radiation sensor in turn changes the amplitude of the additional alternating current in such a way that the joulean heat converted in the incandescent filament remains as constant as possible.

The use of an incandescent filament together with a radiation sensor presents, in comparison with the use of an externally heated NTC the advantage that, due to the higher temperature of the incandescent filament, a change of the environmental temperature becomes less effective.

In a third advantageous development, the regulating device comprises a microprocessor and a digital/analog converter.

The microprocessor, generally already present in the scale, receives from the analog/digital converter the informaion on the magnitude of the compensation direct current and calculates therefrom the load of the scale and, in this embodiment, also the amplitude necessary for constant joulean heat, of the additional alternating current. This value is indicated by the microprocessor as digital number and converted in a series-connected (so as to follow the microprocessor) digital-/analog converter into an analog voltage which determines the amplitude of the additional alternating current.

In order to prevent the additional alternating current from affecting the accuracy of the analog/digital converter, the frequency of the additional alternating current is advantageously chosen in such a manner that the chronological operating sequence of the analog/digital converting operation taking place in the analog/digital converter is in a constant phase relation to the additional alternating current. This is possible, e.g., by deriving the frequency of the additional alternating current and the sequence control of the analog/digital converter from the same time basis.

The connection of the additional alternating current takes place suitably via a condenser which together with the coil forms a series resonant circuit whose resonant frequency is advantageously at least approximately equal to the frequency of the additional alternating current. As a result thereof, the alternating voltage necessary to generate the additional alternating current is particularly small.

A further decrease of the necessary alternating voltage results when the coil has a tapping device which is connected, via the condenser, to the output of the alternating voltage source. The additional alternating current flows then in the two coil halves in opposite directions; on the one hand through the measuring resistor and on the other through the heating resistor or the incandescent filament and the output resistor of the control amplifier. When the two coil halves have the same number of windings and when the ohmic resistance of the measuring resistor and of the heating resistor or incandescent filament (at low ohmic output resistance of the control amplifier) are equal, the additional alternating current is divided at the ratio of 1:1, so that at one time the heating effect in the two branches is equal and at another time the inductivity of the coil is ineffective.

When the scale is provided with an additional correction coil in the permanent magnet system, it is of course suitable to divide this corretion coil, too, into two parts which are traversed by the compensation direct current in the same direction, and by the additional alternating current in opposite directions. Then, the inductivity of the correction coil for the additional alternating current is ineffective and, nevertheless, a load-independent heat generation is also obtained in the correction coil.

The scale of the invention thus presents the advantage that the joulean heat, independently of the load, is generated at the same magnitude and at the same location. Therefore, varying temperature gradients in the coil and on the measuring resistor do not occur. Moreover, no switching operations are necessary, so that no voltage peaks on the coil can occur. Besides, the switching means and the regulating device can subsequently be easily installed in existing circuits since the normally present analog direct current regulating circuit remains fully preserved.

DETAILED DESCRIPTION OF THE PREFERRED EMBODIMENTS

Figure 1:
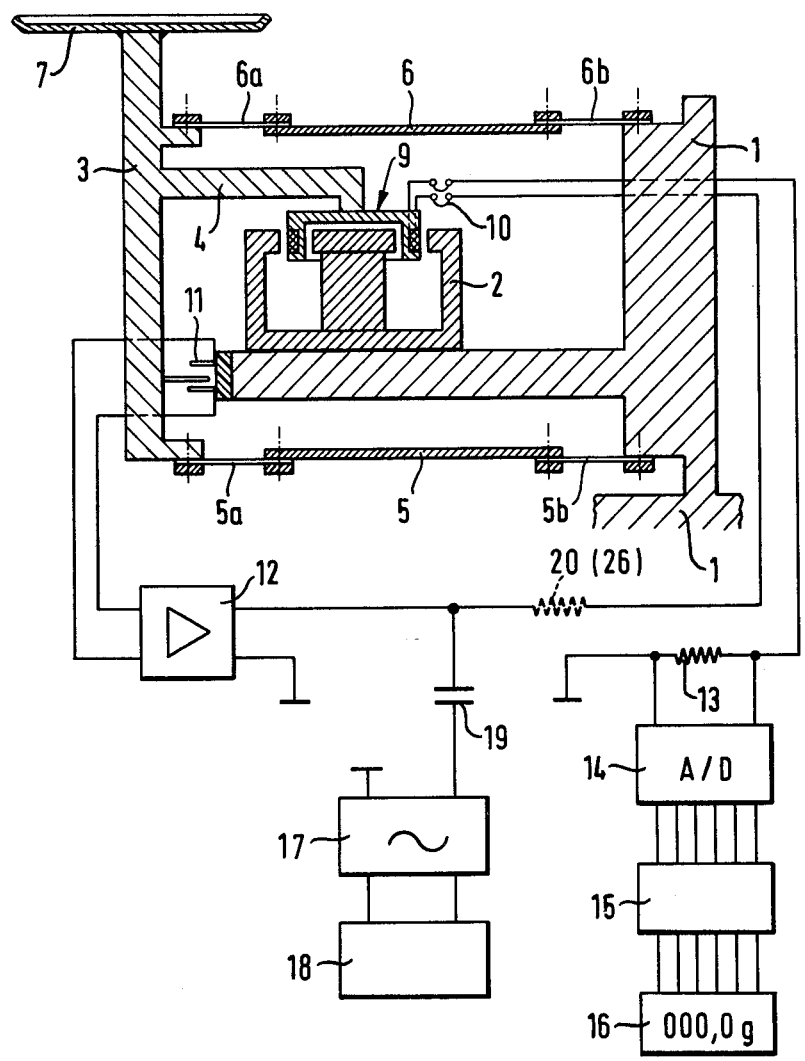
FIG. 1 shows in diagram an electronic scale according to the principle of electromagnetic force compensation, the mechanical portion being shown in section, and the electronic system with additional alternating current supply shown as block diagram.

A first form of the supply of the additional alternating current is shown in FIG. 1. The mechanical part of the scale consists in a movable load support 3 which carries the load pan 7 and is connected, via two guides 5 and 6 in the form of a parallel construction, with the stationary part 1 of the scale. Leaf springs 5a, 5b, 6a, 6b at the ends of guides 5 and 6 serve as joints. Load support 3 supports on a projecting arm 4 a coil 9 which interacts with the field of a stationary permanent magnet system 2. A position sensor 11 scans the position of load support 3 and supplies, via a control amplifier 12 the current necessary for compensating the load. This compensation direct current is fed via movable feed lines 10 to coil 9 and passes at the same time through a measuring resistor 13. A current-proportional measuring voltage is scanned at measuring resistor 13, and is digitized in an analog/digital converter 14, processed in a digital computer circuit 15, and indicated in a digital indicator 16.

Electromagnetically compensating scales of this type are known in their mechanical structure as well as with respect to their electronic system, so that a detailed description is superfluous. The parts of such a scale may be spatially arranged, e.g., in the manner described in U.S. Pat. No. 4,062,416. The mode of operation of the electromagnetic force compensation is described, e.g., in U.S. Pat. No. 4,150,730, in the first part of "Background of the Invention".

In addition, in the scale of the invention, circuit elements 17 are provided which pass an additional alternating current through coil 9 and measuring resistor 13. The uncoupling of the compensation direct current supplied by control amplifier 12 and of the alternating current fed by circuit 17 takes place, in the scale of FIG. 1, by the fact that the output of the control amplifier is constructed as a current source and the circuit 17 is provided at its output with a condenser 19. Furthermore, a regulating device 18 is provided which determines the amplitude of the additional alternating current supplied by circuit 17 is chosen in such a way that the joulean heat generated by the compensating direct current and by the additional alternating current in coil 9 and in measuring resistor 13 is as load-independent as possible. The joulean heat generated by the compensation direct current in measuring resistor 13 is, as known given by $I_{=}^2 \times R$, in which formula R is the electric resistance of the measuring resistor. The joulean heat generated by the additional alternating current is given by $I_\sim^2 \times R$, in which formula $I_\sim$ is to indicate the effective value of the alternating current. The requirement mentioned above of load-independent joulean heat in the measuring resistor requires therefore:

$$I_{=}^2 \times R + I_\sim^2 \times R = \text{const.} \tag{1}$$

or $$I_{=}^2 + I_\sim^2 = \text{const.}/R \tag{2}.$$

The amplitude of the additional alternating current must therefore be varied according to the equation $$I_\sim^2 = (\text{const.}/R) - I_{=}^2 \tag{3}$$

as a function of the load of the scale, i.e., as a function of $I_=$. The same considerations apply analogously also to coil 9.

Figure 2:
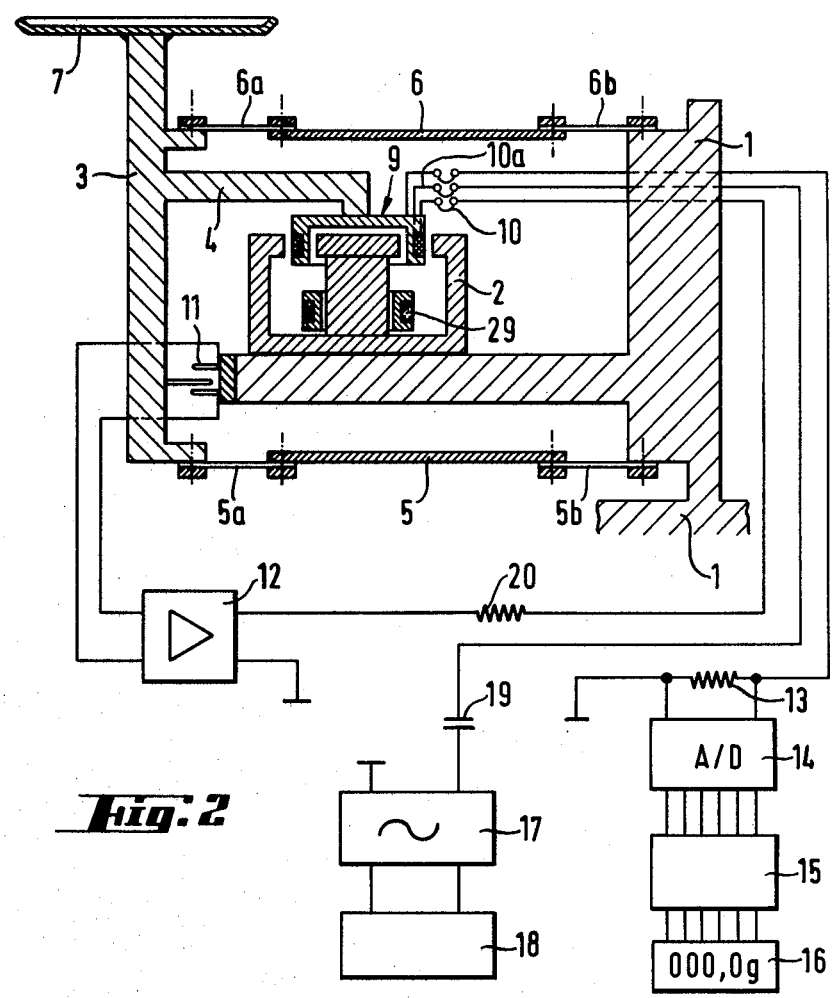
FIG. 2 shows in the same way as FIG. 1 an electronic scale with a different form of additional alternating current supply.

Another form for the feeding of the additional alternating current is shown in FIG. 2. The same elements as in FIG. 1 are marked by the same reference numerals. This form is characterized in that coil 9 is provided with a tap 10a which subdivides the coil into two, preferably equal, partial coils, and that circuits 17 are connected, via a condenser 19, to this tap 10a. The additional alternating current fed by circuit 17 is therefore divided into two partial currents, one partial current flowing via one coil half 9a (see FIG. 4) and measuring resistor 13, while the other partial current flows via the other coil half 9b, a resistor 20 and the output resistor, in this case preferably of low resistance, of control amplifier 12. When the two parts of coil 9 have the same number of windings, and when resistor 20, together with the low output resistance of control amplifier 12 is as high as the measuring resistance 13, the two partial alternating currents are of equal magnitude and act thermally like an alternating current which flows, according to the form of FIG. 1, through resistor 20, the entire coil 9, and the measuring resistor in one direction. In FIG. 2, however, due to the opposing current flow of the additional alternating current in the two halves of coil 9, the inductivity of the coil does not become effective. Likewise, the forces of the additional alternating current in the two halves of coil 9 compensate one another, so that no oscillations of the movable elements of the scale are generated. The compensation direct current is not affected by the tap and the alternating voltage source connected therewith via condenser 19.

Figure 3:
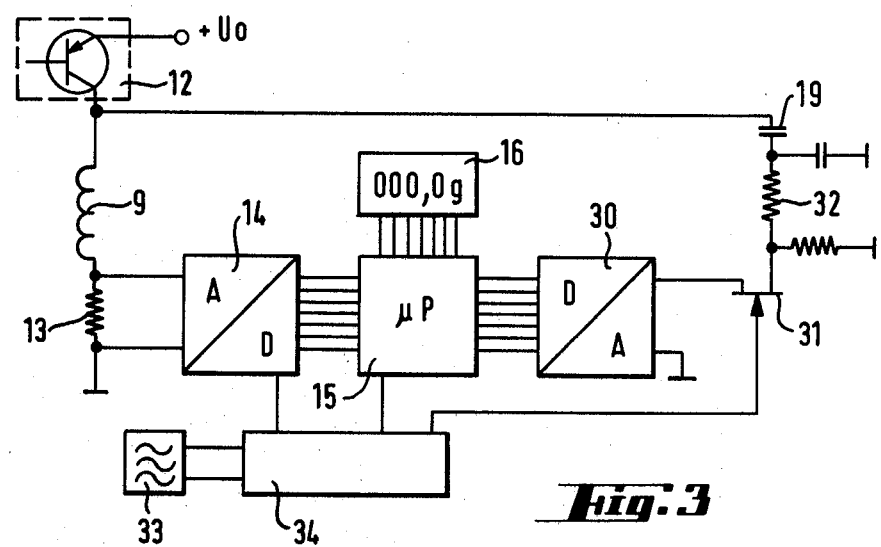
FIG. 3 shows the essential portion of the electronic circuit in a first modification.

FIG. 3 shows more precisely, in a first modification circuit 17 and regulating device 18 in cooperation with the rest of the scale of FIG. 1. An essential constituent of this modification is a microprocessor 15 which receives via analog/digital converter 14 the load-dependent signal from measuring resistor 13. This microprocessor calculates therefrom the joulean heat produced by the compensation direct current, supplied by the output current source of control amplifier 12, in coil 9 and in measuring resistor 13, and therefrom, according to equation (3), the necessary amplitude of the additional alternating current. This numerical value is transmitted by microprocessor 15 to a digital/analog converter 30 which generates a direct voltage therefrom. The chronological control of the analog/digital converter 14 and microprocessor 15 is assumed by a high frequency generator 33 as time basis, with a multistage frequency divider 34 connected in parallel so as to follow the microprocessor. The signal of a divider stage of this frequency divider is fed to a switching transistor 31 which periodically interrupts the output voltage of digital/analog converter 30, and thus transform it into a rectangular alternating voltage of the same amplitude. This rectangular alternating voltage is filtered out in a filter element 32, and the fundamental oscillation is fed via condenser 19 between the highly resistant output of the control amplifier 12 and coil 9. This produces a constant phase relation between the chronological sequence of the analog/digital conversion process taking place in the analog/digital converter, and the additional alternating current. This additional alternating current passes like the compensation direct current through coil 9 and measuring resistor 13 and produces in both a load-independent heat generation.

In the preceding description, it has been assumed that the alternating voltage generated by the additional alternating current in measuring resistor 13 does not affect the analog/digital converter. At constant phase relation between the additional alternating current and the digitizing operation in the analog/digital converter this is the case, e.g., in the multiple ramp procedure according to German Pat. No. 21 14 141. For analog/digital converters whose suppression factor for interfering alternating voltages is not sufficient, an additional low-pass filter must be inserted between measuring resistor and analog/digital converter in a known manner.

Figure 4:
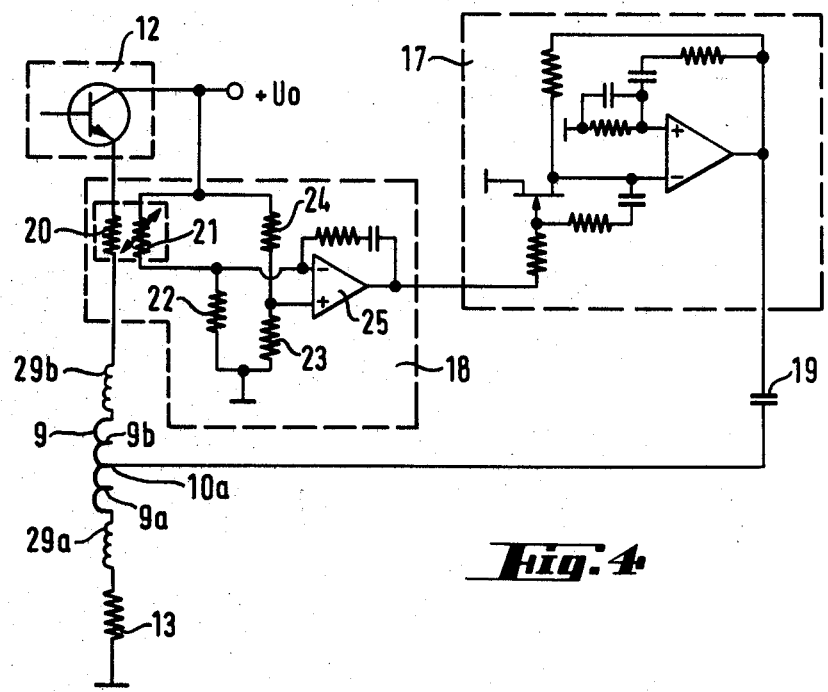
FIG. 4 shows the essential portion of the electronic circuit in a second modification.

FIG. 4 more precisely shows circuit 17 and regulating device 18 in a second modification in cooperation with the rest of the scale of FIG. 2. The compensation direct current supplied by the low-resistance output (shown as emitter follower) of control amplifier 12 flows successively through a heating resistor 20, coil 9 and measuring resistor 13. This heating resistor 20 is in close thermal contact with an NTC resistor 21 which serves as a thermal detector. NTC resistor 21 forms, together with resistors 22, 23 and 24 a bridge whose diagonal voltage determines, via a feedback sum-and-difference amplifier and integrator 25, the amplitude of a conventional alternating voltage generator 17. This alternating voltage generator 17 is connected, via a condenser 19, to the tap 10a of coil 9 and permits the passing of an additional alternating current through coil half 9a and measuring resistor 13 as well as through the other coil half 9b, heating resistor 20 and the output resistance of control amplifier 12. The regulating device 18 is designed in such a way that at a temperature drop on heating resistor 20, caused, e.g., by a smaller load of the scale and thereby a smaller compensation direct current, the amplitude of alternating voltage generator 17 is increased until the temperature of the latter is again increased to the previous or rated value via the additional joulean heat caused by the additional alternating current in the heating resistor 20. Since, as described above, at the same number of windings of the two coil halves 9a and 9b and at the same resistance value for measuring resistor 13, and for the sum from heating resistor 20 and output resistance of control amplifier 12, the two partial alternating currents through the measuring resistor and through the heating resistor are of equal magnitude, a load-independence of the joulean heat for heating resistor 20 means also a load-independence of the joulean heat in coil 9 and in measuring resistor 13.

The rate temperature selected for the NTC is suitably as high as possible in order to keep the influence of the environmental temperature upon the NTC temperature as small as possible in comparison with the influence of heating resistor 20. In a known manner, a remaining residual influence can be compensated by a small temperature dependence of one of the other bridge resistors 22 to 24.

In some scales it is necessary to neutralize by means of an additional correction coil 29 the feedback of the compensation direct current in coil 9 upon the magnetic field strength of permanent magnet system 2. This correction coil 29 in the permanent magnet system 2 is normally located in a series-connection to coil 9 and is traversed by the same compensation current. In the scale of the invention it is suitable to divide this correction coil 29 also into two parts 29a and 29b and to connect those parts according to FIG. 4 in such a way that the compensation direct current flows through both parts in the same direction, while the additional alternating current flows through the two parts in opposite directions.

Figure 5:
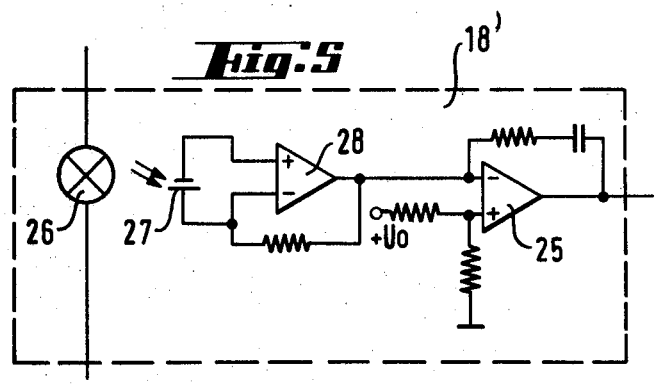
FIG. 5 shows a section of the electronic circuit according to FIG. 4 in a third modification.

FIG. 5 shows a third modification 18' for the regulating device which can be employed, e.g., in place of the regulating device 18 shown in FIG. 4. In this modification, an incandescent filament is provided, e.g., in the form of a commercial incandescent lamp 26, which is traversed by the compensation direct current as well as by the additional alternating current. The temperature of the incandescent filament is measured by means of its emanated light radiation by a photoelement 27. The short circuit current of the photoelement 27 is transformed in an amplifier 28 into a voltage and fed to an amplifier and integrator 25 which modifies the amplitude of the successively series-connected alternating voltage generator 17 in such a way that the joulean heat transformed in the incandescent filament remains as constant as possible.

Of course, the two forms of the alternating current feed at the end of coil 9 or at the tap 10a of coil 9 can in any manner be combined with one of the three described modifications for the regulating device 18. Likewise, it is easy to insert, in the embodiment of FIG. 4, a synchronisation of alternating voltage generator 17 by means of the time basis 33 of analog/digital converter 14 so as to achieve a constant phase relation between the chronological course of the analog/digital converting operation taking place in the analog/digital converter, and the additional alternating current.

Besides, it is also possible, e.g., after the switching-on of the mains supply of the scale to keep the amplitude of the additional alternating current, independently of the regulating device 18, at its maximum value for a length of time, in order to reach as quickly as possible the operating temperature.

What we claim as new and desire to secure by United States Letters Patent is:

1. A scale according to the principle of electromagnetic force compensation, comprising:
    a stationary permanent magnet system having an air gap;
    a position sensor for sensing position of the scale;
    circuit means connected with the position sensor, and including a control amplifier;
    at least one coil positioned in the air gap of the stationary permanent magnet system and acted upon, via the position sensor and the control amplifier, by a compensation direct current dependent on the load of the scale;
    said circuit means including an analog/digital converter and a measuring resistor, the same compensation direct current, flowing through the measuring resistor and at both ends of which a signal dependent on the load of the scale is tapped and fed to the analog/digital converter; and
    further electric circuits which permit an alternating current to flow, in addition to the compensation direct current, through the coil and the measuring resistor, and including a regulating device which modifies the amplitude of the additional alternating current in such a manner that the joulean heat generated in the coil and in the measuring resistor by the compensation direct current and by the additional alternating current is at least approximately load-independent.

2. A scale as in claim 1, wherein:
    the regulating device comprises a heating resistor and a thermal detector in close thermal contact, in which structure the heating resistor is series-connected to the coil and the measuring resistor and is likewise traversed by the compensation direct current and the additional alternating current; and controls, via a regulating circuit the amplitude of the additional alternating current in such a way that the output signal of the thermal detector remains as constant as possible.

3. A scale as in claim 1, wherein:
    the regulating device comprises an incandescent filament and a radiation sensor in which structure the incandescent filament is series-connected to the coil and the measuring resistor and is likewise traversed by the compensation direct current and by the additional alternating current in such a way that the output signal of the radiation sensor remains as constant as possible.

4. A scale as in claim 1, wherein:
    the regulating device comprises a microprocessor and a digital/analog converter, in which structure the microprocessor calculates from the output signal of the analog/digital converter the necessary amplitude of the additional alternating current and transmits it via the digital/analog converter as analog voltage.

5. A scale as in claim 2, wherein:
the tap of the coil divides the latter into two halves of the same number of windings; and
the measuring resistor on the one hand, and the series-connection of the heating resistor and the output resistance of the control amplifier on the other hand present an approximately equal ohmic resistance.

6. A scale as in claim 2, wherein:
an NTC resistor is employed as the thermal detector.

7. A scale as in claim 1 or 2 or 6 or 3 or 4, wherein:
the frequency of the additional alternating current is such that the chronological sequence of the analog/digital converting operation taking place in the analog/digital converter is in a constant phase relation to the additional alternating current.

8. A scale as in claim 7, wherein:
the frequency of the additional alternating current and the sequence control of the analog/digital converter are derived from the same time basis.

9. A scale as in claim 1 or 2 or 6 or 3 or 4, wherein:
the additional alternating current is connected via a condenser.

10. A scale as in claim 9, wherein:
the additional alternating current is connected via the condenser to a tap of the coil.

11. A scale as in claim 10, wherein:
an additional correction coil is connected in the permanent magnet system, and the additional correction coil is divided into two parts through which the compensation direct current flows in the same direction, and the additional alternating current in opposite directions.

12. A scale as in claim 10, wherein:
the tap of the coil divides the latter into two halves of the same number of windings; and
the measuring resistor on the one hand, and the series-connection of the heating resistor and the output resistance of the control amplifier on the other hand present an approximately equal ohmic resistance.

13. A scale as in claim 12, wherein:
an additional correction coil is connected in the permanent magnet system, and the additional correction coil is divided into two parts through which the compensation direct current flows in the same direction, and the additional alternating current in opposite directions.

* * * * *